US009214078B1

(12) United States Patent
Seese

(10) Patent No.: US 9,214,078 B1
(45) Date of Patent: Dec. 15, 2015

(54) INDIVIDUAL ACTIVITY MONITORING SYSTEM AND METHOD

(71) Applicant: David Seese, Houston, TX (US)

(72) Inventor: David Seese, Houston, TX (US)

( * ) Notice: Subject to any disclaimer, the term of this patent is extended or adjusted under 35 U.S.C. 154(b) by 14 days.

(21) Appl. No.: 14/307,070

(22) Filed: Jun. 17, 2014

(51) Int. Cl.

| | |
|---|---|
| ***G08B 23/00*** | (2006.01) |
| ***G09B 21/00*** | (2006.01) |
| ***G08B 29/00*** | (2006.01) |
| ***G08B 1/00*** | (2006.01) |
| ***F17D 3/00*** | (2006.01) |
| ***G08B 21/04*** | (2006.01) |
| ***G08B 25/00*** | (2006.01) |

(52) U.S. Cl.
CPC ............ *G08B 21/0484* (2013.01); *G08B 25/00* (2013.01)

(58) Field of Classification Search
CPC ...... G08B 21/22; G08B 21/088; G08B 23/00; G08B 25/14; G08B 25/12; A61B 5/0031; A61F 4/00; A61J 7/0481; F16K 31/48
USPC ........... 340/573.1, 573.6, 4.1, 4.11, 500, 506, 340/309.16; 137/624.11
See application file for complete search history.

(56) References Cited

U.S. PATENT DOCUMENTS

| | | | | |
|---|---|---|---|---|
| 5,205,318 | A * | 4/1993 | Massaro et al. | 137/337 |
| 7,057,507 | B1 * | 6/2006 | Sandifer | 340/531 |
| 8,220,722 | B1 * | 7/2012 | Shaffer | 236/94 |
| 2009/0224927 | A1 * | 9/2009 | Sudy et al. | 340/605 |
| 2012/0050049 | A1 * | 3/2012 | Quinones Caballero | 340/573.6 |
| 2012/0212344 | A1 * | 8/2012 | Forsberg et al. | 340/573.1 |
| 2015/0148971 | A1 * | 5/2015 | Acker | 700/282 |

* cited by examiner

*Primary Examiner* — George Bugg
*Assistant Examiner* — Munear Akki
(74) *Attorney, Agent, or Firm* — Wei Wei Jeang; Grable Martin Fulton PLLC

(57) ABSTRACT

An individual activity monitoring system comprises a microphone configured to receive sounds and convert them to audio signals, a memory configured to store recorded audio signal patterns of water flow events, and a microprocessor coupled to the microphone and configured to receive the audio signals, compare the audio signals to the recorded audio signal patterns, and recognize whether the audio signals represent a water flow event. The microprocessor is configured to reset a reset clock in response to a recognized water flow event, and being further configured to issue an alert notification in response to an absence of a subsequent water flow event after the reset clock exceeds a preprogrammed time period since a last recognized water flow event.

24 Claims, 8 Drawing Sheets

INDIVIDUAL ACTIVITY MONITORING SYSTEM AND METHOD

FIELD

The present disclosure relates to the field of home medical alert devices and more particularly to an individual activity monitoring system and method.

BACKGROUND

Existing home medical alert systems typically take the form of a device carried or worn on the person being monitored, usually in the form of a pendant worn around the neck. When the individual experiences a health crisis or an accident, an alert can be activated by, for example, pushing a button on the device. The activation causes the device to transmit a wireless signal to a receiver which then calls or notifies the monitoring company to send help.

Many existing medical alert devices can only send a notification if the person using the system remains conscious and is able to push the button on the device. Many health-threatening events may occur that cause the person to lose consciousness or become incapacitated such that they are unable to request assistance.

Further, some people who could benefit from a medical alert system choose not to use such a system because they prefer not to carry or wear the required physical device.

DETAILED DESCRIPTION

The individual activity monitoring system and method 10 are capable of automatically determining when a person has experienced a health-threatening event and generating an alert to seek assistance. More specifically, the system and method 10 monitor certain normal and regularly occurring day-to-day activities of an individual. If the system determines that the normal day-to-day activities ceased to occur for a specified time period, the system then sends one or more alert messages to one or more persons and/or monitoring company so that assistance and medical attention may be rendered.

Figure 1:
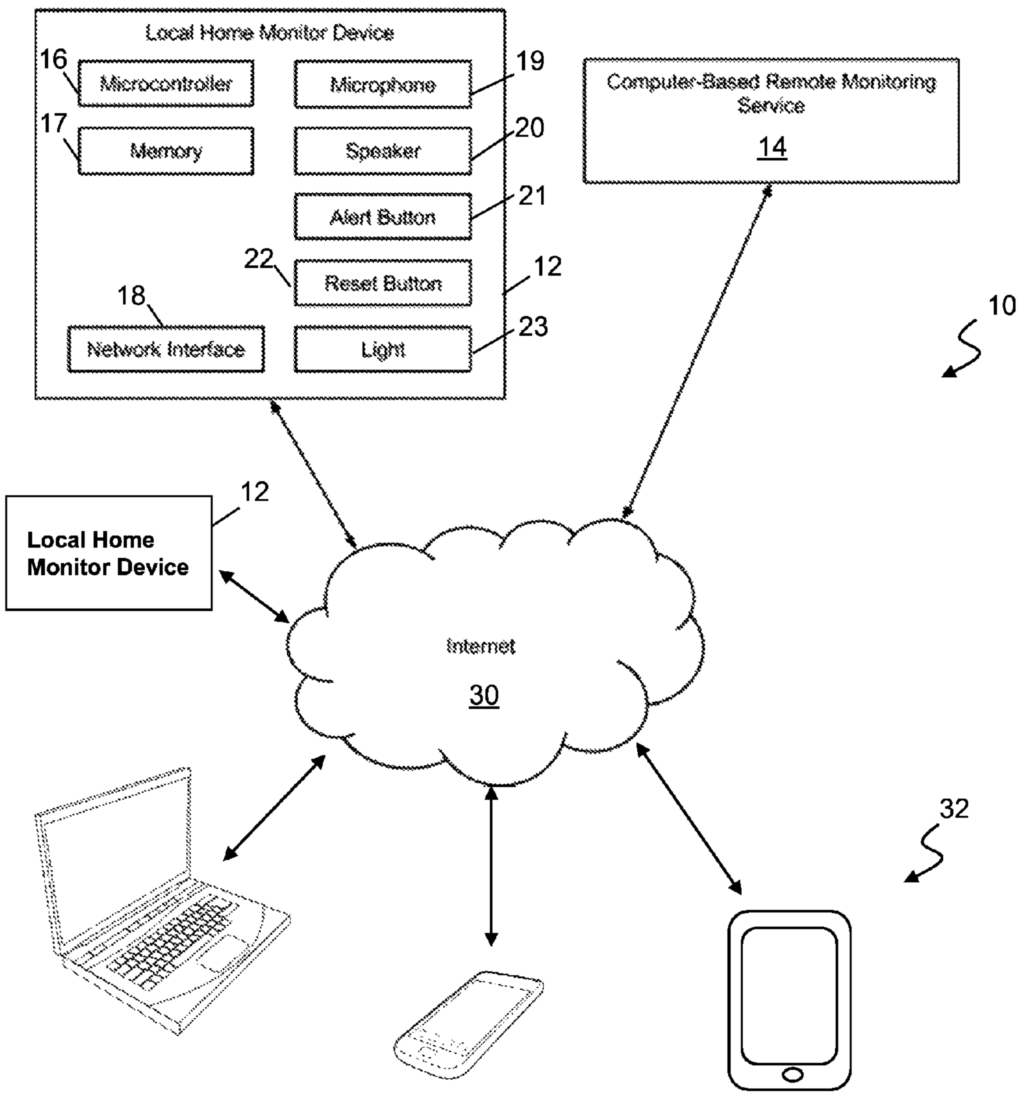
FIG. 1 is a simplified block diagram of an exemplary embodiment of an individual activity monitoring system and method according to the present disclosure.

Referring to FIG. 1, the individual activity monitoring system and method 10 may include at least one local monitor device 12 in communication with a central remote monitoring system 14. The central remote monitoring system 14 may provide centralized control and monitoring of the at least one local monitor device 12. A facility or residence may employ one or more local monitor device 12 under the control of one or more remote monitoring system 14.

A local monitor device 12 preferably includes a special-purpose microcontroller 16, memory 17, a network interface

18, at least one microphone 19, a speaker 20, an alert button 21, a reset button 22, and a light 23. The local monitor device 12 is installed in a home of an individual who is being monitored. Alternatively, the local monitor device 12 may include a small display screen to display its operating status. The local monitor device 12 is able to access a global computer network such as the Internet 30 via wired and/or wireless means and communicate with the computer-based remote monitoring system 14. Further, the remote monitoring system 14 and/or local monitor device 12 are coupled to the telecommunications network for sending and receiving messages such as short messages, multimedia messages, etc.

The central remote monitoring system 14 also preferably includes a special-purpose microcontroller configured to execute one or more computer programs in coordination with the at least one local monitor device 12, memory, and a network interface to the telecommunication network and/or the global computer network. The local monitor device 12 and the computer-based remote service 14 are configured to communicate with each other by sending and receiving messages over the Internet 30. Embodiments may include various steps, which may be embodied in machine-executable instructions to be executed by a general-purpose or special purpose computer.

The individual activity monitoring system and method 10 may deploy more than one local monitor device 12 for a single location or residence, such as large homes with many rooms. Alternatively, more than one microphone in wireless or wired communication with the local monitor device 12 may be placed around the house, such as in the bathrooms and the kitchen where water flow events are being monitored. The individual activity monitoring system and method 10 may include more than one remote monitoring systems 14 distributed geographically. For example, the individual activity monitoring system and method 10 may deploy one or more remote monitoring system 14 in each city or town. The plurality of remote monitoring system instances may or may not be coordinated in operations.

A variety of computing devices 32 may be used to communicate with the local monitor device 12 and/or remote monitoring system 14 for programming purposes and setting operating parameters, such as resetting the system, setting the telephone numbers for sending alert notifications, etc. These computing devices 32 may include laptop computers, tablet computers, mobile telephones, desktop computers, and other suitable devices. More details on the operations of these mobile devices 32 in operating with the individual monitoring system and method are set forth below.

Figure 2:
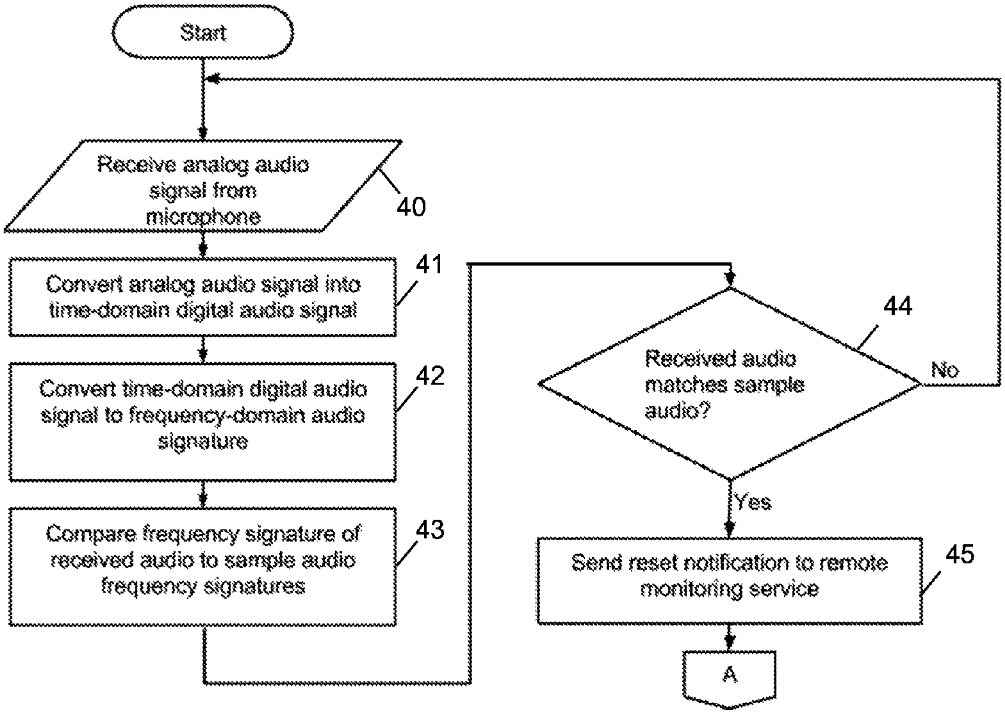
FIGS. 2-6 are simplified flowcharts of an exemplary process of the individual activity monitoring system and method according to the present disclosure.

FIG. 2 is a flowchart of an exemplary process of the individual monitoring system and method 10 occurring at the local monitor device 12. The microcontroller 16 of the local monitor device 12 continually receives an audio signal from the microphone 19, as shown in block 40. The system 10 monitors the received audio signal for one or more sound patterns indicating that the user of the system is conscious and moving around. Specifically, the local monitor device 12 may identify sounds made by water flowing from a faucet into a kitchen or bathroom sink, water flowing in a shower, water filling a bathtub, or a toilet flushing.

The microcontroller 16 of the local monitor device 12 receives a time-domain digital representation of the analog audio signal from one or more microphones 19 and an analog-to-digital converter (not explicitly shown), as shown in block 41. The local monitor device 12 may then utilize a fast Fourier transform algorithm to produce a digital representation of the received audio signal in the frequency domain from the time-domain digital representation of the received audio signal, as shown in block 42. The frequency-domain representation of an audio signal is commonly referred to as the "frequency signature" of the audio signal. The local monitor device 12 compares the frequency signature of the received audio signal with a set of stored frequency signatures of sample audio signals to determine if the received audio signal matches any of the sample audio signals, as shown in block 44. The audio samples include, for example, audio recordings of water flowing from a faucet into a kitchen or bathroom sink, water flowing from a shower, water filling a bathtub, and toilet flushing. Other user activities may also be monitored. For example, the system 10 may be configured to recognize footsteps, and/or utterances of "help" and other vocabulary, for example. These audio samples may be obtained from actual recordings of these water flow events in the same home to ensure a close match to the actual sounds, or the system may use pre-recorded samples of water flow events from a variety of locales.

Figure 3:
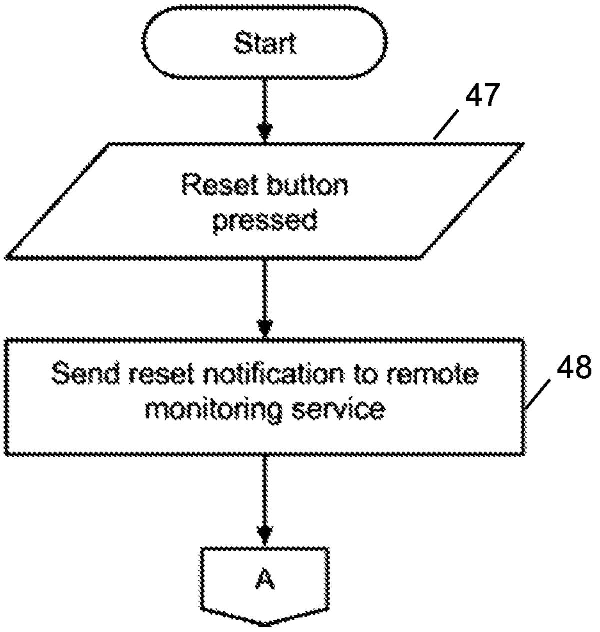

If the local monitor device 12 determines that the frequency signature of the received audio signal matches one of the set of stored frequency signatures of sample audio signals, then a water flow event is said to have occurred. Each time a water flow event occurs, the local monitor device 12 stores a timestamp associated with the water flow event, and sends a reset notification message to the remote monitoring system 14, as shown in block 45. In addition as shown in FIG. 3, if the user of the system presses the reset button 22 on the local monitor device 12, as shown in block 47, then the local monitor device 12 sends a reset notification message to the remote monitoring system 14, as shown in block 48.

It should be noted that more complex logic or artificial intelligence may be employed to improve the accuracy of situations warranting the alert status. For example, the logic may further monitor the duration of a water flow event. The identification of a prolonged water flow event may indicate a situation where the user may need assistance, such as, for example, when the user has slipped in the shower and becomes incapacitated or unconscious.

Further, the local monitoring device 12 may include logic or artificial intelligence that discriminates between day and night time activities to account for the absence of water flow events during the user's sleep period, for example. Further logic or artificial intelligence may be employed to familiarize the system with the user's activity pattern, so that durations of sleep time are not mistaken for alert situations, for example. Another embodiment of the system and method provides a way to avoid sending alert notification messages when the user of the system is sleeping. When the remote monitoring system 14 determines that the time period since the last occurring reset event exceeds the preconfigured time period, then the remote monitoring system 14 sends an alert notification message to the local monitor device 12. However, if the last reset event occurred before 2 a.m. local time at the location of the local monitor device 12, and the alert notification is scheduled to be sent after 2 a.m., then the remote monitoring system 14 will instead wait until the preconfigured time period after 2 a.m. before sending the alert notification message if no reset event occurs before that time.

Another embodiment of the system and method provides a way for the remote monitoring system 14 to automatically adjust or calibrate the configured time period between a reset event and an alert notification for a given local monitor device 12 based on the observed patterns for that user. For example, during the initial two week period that a specific local monitor device 12 is deployed, the remote monitoring system 14 records the time (timestamps) that each reset event occurs for that specific local monitor device 12. After a two week period of time has passed since the first reset event for the specific local monitor device 12, the remote monitoring system 14 calculates the time periods between all reset events, ignoring the time periods during typical sleep times. The remote monitoring system 14 may calculate an "alert timeout period" value which represents the longest ninety-fifth percentile (95%) value, for example, for the time periods between recorded reset events. That is, ninety-five percent of the historical time periods between reset events are shorter than the calculated alert timeout period and five percent of the historical time periods between reset events are longer than the calculated alert timeout period. Then the remote monitoring system 14 sets the preconfigured time period between a reset event and an alert notification for the specific local monitor device 12 to the calculated alert timeout period value. This calibration process may be repeated periodically to adapt to the user's change of habit or lifestyle over time.

Figure 4:
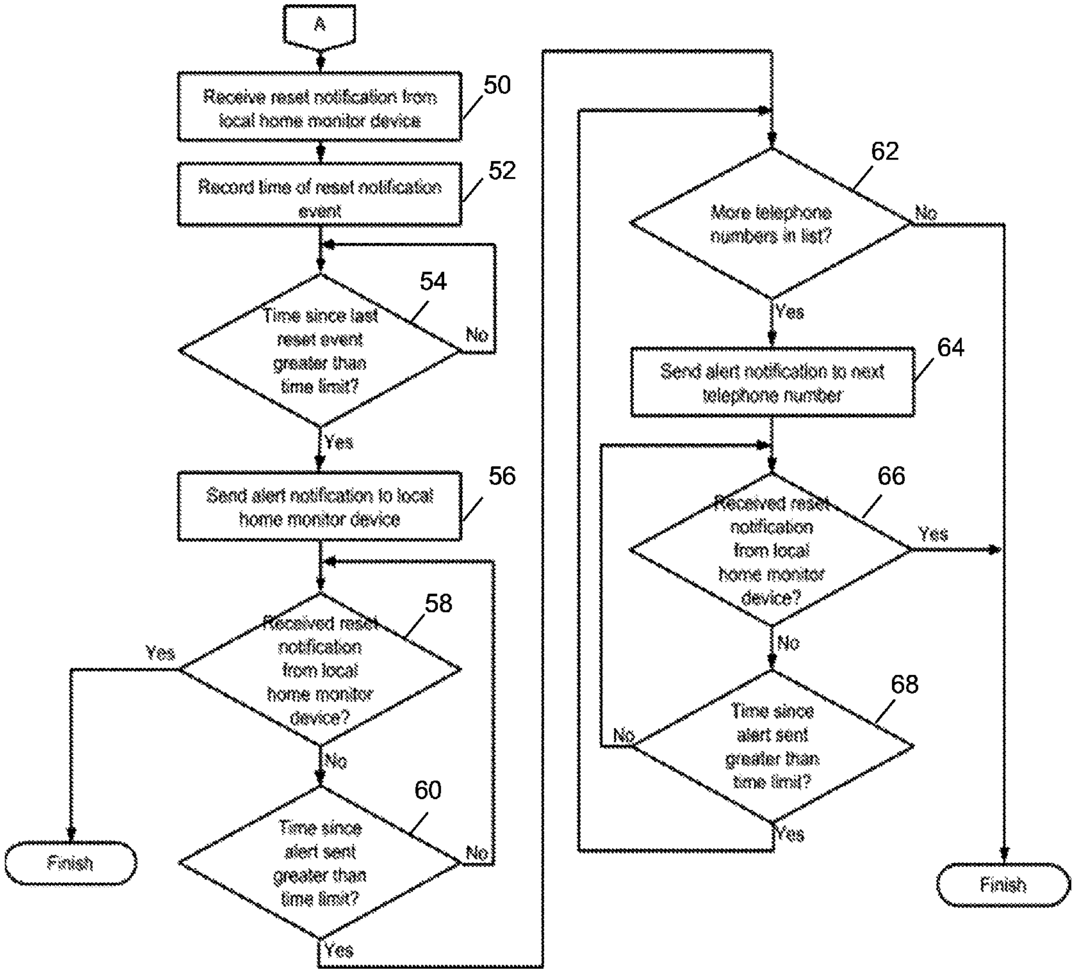

FIG. 4 is a flowchart of an exemplary process of the individual monitoring system and method 10 occurring at the remote monitoring system 14. When the remote monitoring system 14 receives a reset notification message from a local monitoring device 12, a reset event is said to have occurred, as shown in block 50. When a reset event occurs, the remote monitoring system 14 records the reset event such that it is associated with the particular local monitor device 12 that sent the notification message along with the time of the reset event, as shown in block 52. The remote monitor service 14 keeps track of the amount of time elapsed since the last reset event for each local monitor device 12, such as by updating a reset clock. If the elapsed time since the last reset event for a particular local monitor device (as indicated by the reset clock) exceeds a preconfigured time limit value, as determined in block 54, then the remote monitoring system 14 sends an alert notification message to the corresponding local monitor device 12, as shown in block 56.

When the local monitor device 12 receives an alert notification message from the remote monitoring system 14, it may display a flashing light and sounds a tone to alert the user of the system. Alternatively, a display screen on the local monitor device 12 may display an alert status. If the user of the system becomes aware of the alert and the user is fine (i.e., a false alarm), the user can press the reset button 22 on the local monitor device 12 to indicate a false alarm. If the reset button is pressed, the local monitor device 12 sends a reset notification message to the remote monitoring system 14. If the remote monitoring system 14 receives a reset notification message from a local monitor device 12, a reset event occurs and the event is recorded corresponding to the local monitor device 12 along with the time of the event, as shown in 58.

If the elapsed time since sending the alert notification message to the local monitor device 12 exceeds a preconfigured time limit value, as determined in block 60, and no reset event has occurred, then an alarm condition has occurred. In response to the alarm condition, the remote monitoring system 14 sends an alert notification message to each successive telephone number in a predetermined or preprogrammed list associated with the particular local monitor device 12, as shown in blocks 62 and 64. Using the preprogrammed telephone numbers, friends, family members, caretakers, and monitoring companies may be notified so that immediate action may be taken. If the elapsed time since sending the alert notification message to the prior telephone number exceeds a preconfigured time limit value, and no reset event has occurred, as determined in blocks 66 and 68, then the remote monitoring system 14 continues to send an alert notification message to the next telephone number in the list of telephone numbers. This process repeats until all of the telephone numbers have been contacted. If a reset event occurs at any time, the reset event is recorded corresponding to the local monitor device 12 along with the time of the reset event, and no further alert notification messages are sent even if uncontacted telephone numbers remain on the list.

The alert notification messages sent to telephone numbers include, for example, Short Messaging Service (SMS) messages, a telephone call with a prerecorded voice message, and/or other forms of suitable communications.

Figure 5:
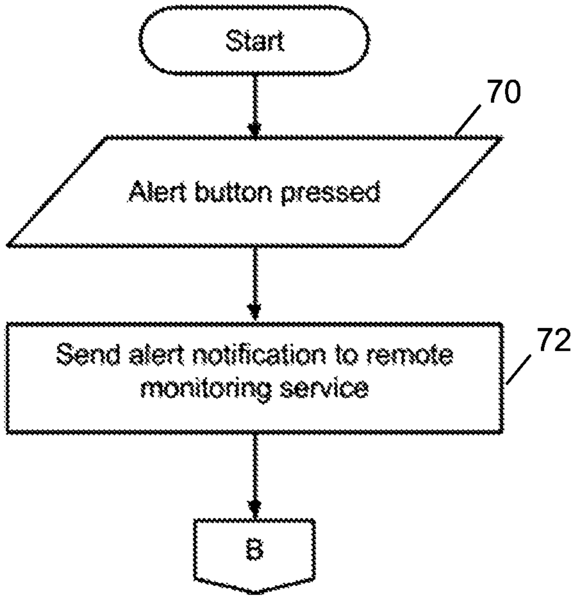
Figure 6:
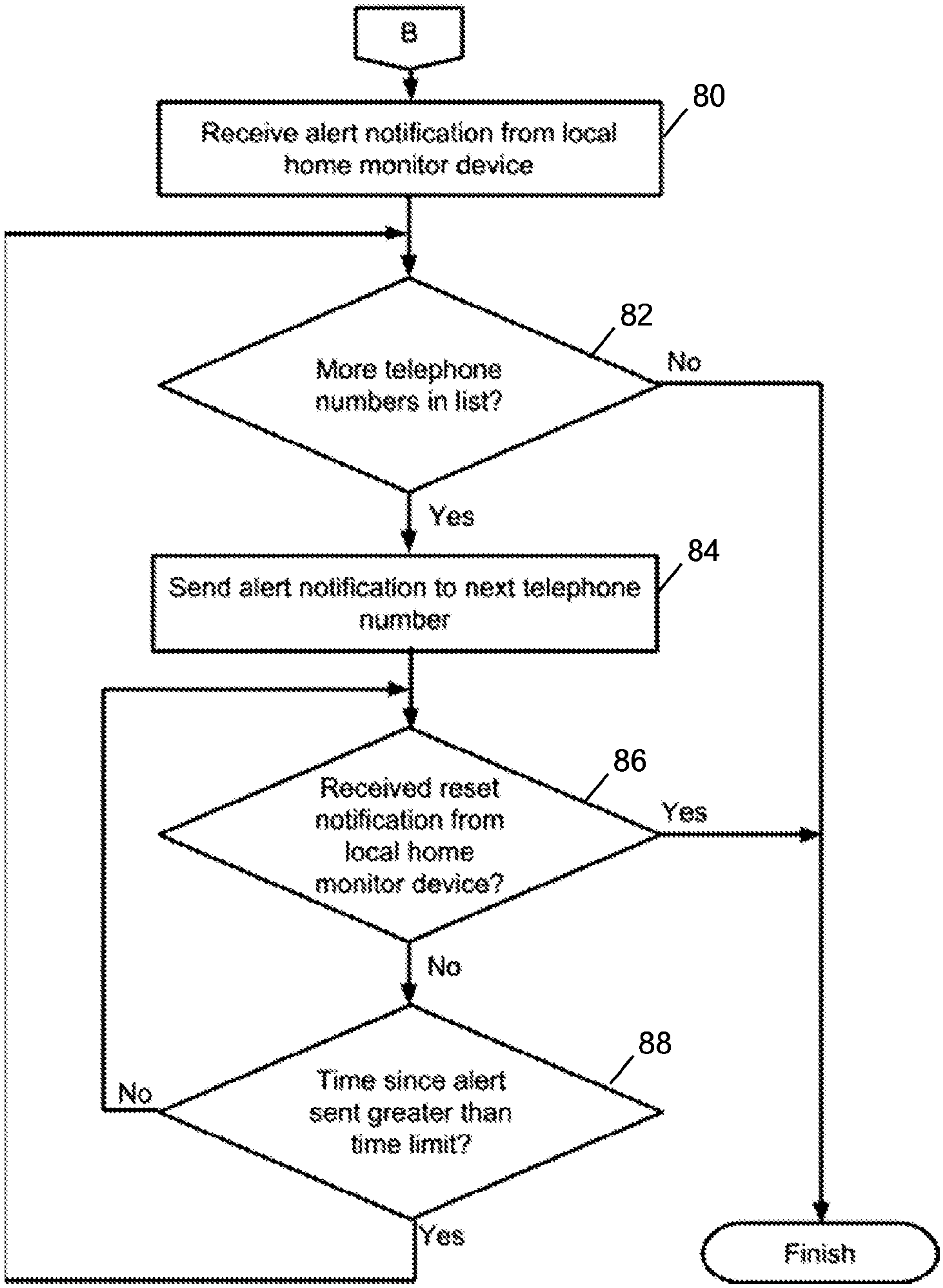

FIG. 5 is a simplified flowchart of an exemplary process to respond to an alert button press at the local monitor device 12 according to the present disclosure. If the alert button 21 on the local monitor device 12 is pressed, the local monitor device 12 sends an alert notification message to the remote monitoring system 14, as shown in blocks 70 and 72. Continuing in FIG. 6, if the remote monitoring system 14 receives an alert notification message from the local monitor device 12, as shown in block 80, then the remote monitoring system 14 begins to send an alert notification message to all of the telephone numbers in the preconfigured or preprogrammed list of telephone numbers associated with the local monitor device 12, as shown in blocks 82 and 84. If the elapsed time since sending the alert notification message to a prior telephone number exceeds a preconfigured time limit value, as determined in block 88, and no reset event has occurred, as determined in block 86, then the remote monitoring system sends an alert notification message to the next telephone number in the list of telephone numbers, as shown in block 84. This process is repeated for each telephone number in the list of telephone numbers until none are left. If a reset event occurs at any time, the reset event is recorded corresponding to the local monitor device 12 along with the time of the event, and no further alert notification messages are sent.

Figure 7:
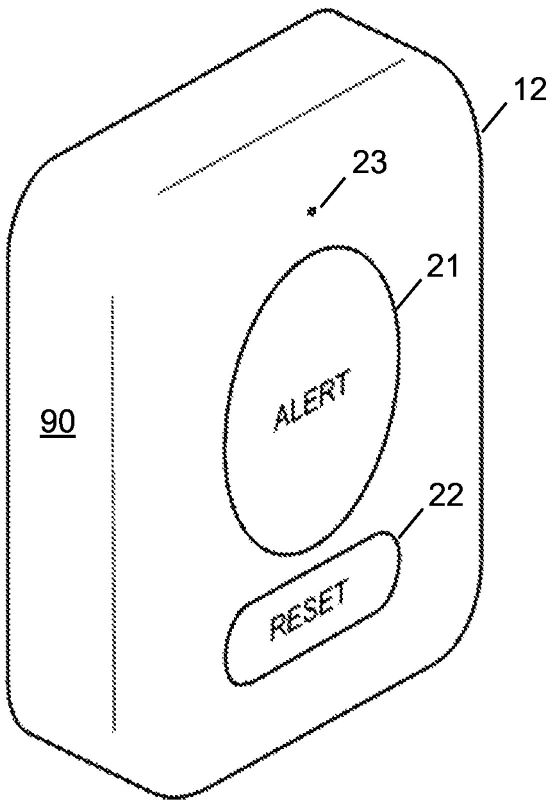
FIG. 7 is a perspective view of an exemplary alert device of the individual activity monitoring system and method according to the present disclosure.

FIG. 7 is a perspective view of an exemplary local monitor device 12 according to the present disclosure. The local monitor device 12 includes a housing 90 that encloses the microprocessor/microcontroller circuitry shown in FIG. 1. The local monitor device 12 is preferably mounted on a wall or can be carried or worn on the person being monitored. As described above, the local monitor device 12 includes an alert button 21, a reset button 22, and a light (e.g., light emitting diode) 23. The light 23 may emit different color light to indicate different operating status. For example, a green light may indicate normal operating status where water flow events are occurring at a normal intervals, and a red light may indicate an alert status where the system has determined that the water flow events are not occurring at the normal interval and that alerts are being transmitted to the list of telephone numbers. As described above, the local monitor device 12 may also or alternately include a display screen for displaying the operating status.

Figure 8:
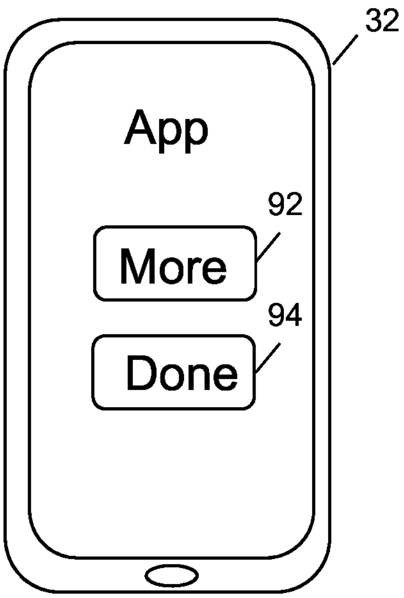
FIGS. 8 and 9 are views of exemplary embodiments of a mobile application (app) with a graphical user interface displayed on a screen of a mobile computing device.

Referring to FIG. 8, another embodiment of the individual activity monitoring system and method 10 additionally provide an application computer program (app) installed on a mobile computing device 32 having a computer processor such as a tablet or smartphone. The mobile device application computer program can be downloaded onto the user's mobile computing device that is associated with the user's local monitoring device 12 and monitoring account. The mobile device application computer program preferably provides a graphical representation of a more button 92 and a done button 94 to enable the user to enter a telephone number to which an alert notification message may later be sent. If a telephone number is entered and the representation of the more button 92 is tapped, the mobile device application computer program provides a method for entering another telephone number. This process is repeated until the representation of the done button 94 is tapped. The mobile device application computer program then sends a message containing all of the entered telephone numbers to the remote monitoring system 14. When the remote monitoring system 14 receives the message containing the telephone numbers, the remote monitoring system stores the telephone numbers with the list of telephone numbers associated with the appropriate home monitor device 12.

Figure 9:
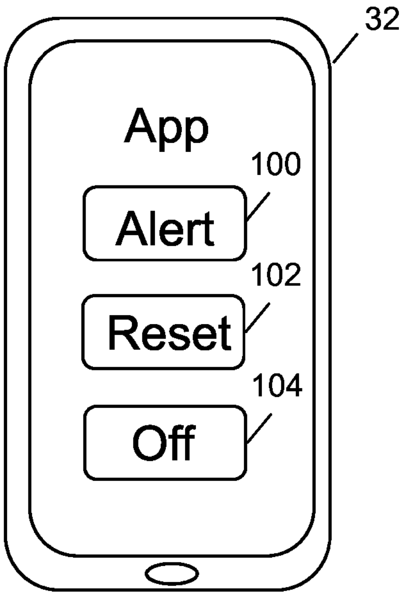

In another embodiment of the invention as shown in FIG. 9, the mobile device application computer program may further present a graphical user interface on the device screen including representations of an alert button 100, a reset button 102, and an off button 104. The alert button 100 and reset button 102 of the mobile device application computer program provide the same functionality as the alert button 21 and reset button 22, respectively, on the local monitor device 12.

If the representation of the off button 104 of the mobile device application computer program is tapped, then the mobile device application computer program provides a method for the user to enter a numeric value indicating the number of days the system is to be temporarily disabled. The mobile device application computer program then sends a disable notification message to the remote monitoring system 14. The disable notification message includes the numeric value entered by the user that indicates the number of days the system 10 is to be temporarily disabled. When the remote monitoring system 14 receives a disable notification message associated with a local monitoring device 12, a disable event is said to have occurred. When a disable event occurs, the remote monitoring system records a reset event such that it is associated with the particular local monitor device 12 that sent the disable notification message along with the time the number of days in the future indicated by the numeric value sent in the disable notification message. The disable operating condition has the effect of preventing the remote monitor system 14 from sending alert notifications during the period of time that the system is to be disabled. The disable operating condition can be used when the user will be absent from the home or monitored facility, such as during vacation or a hospital stay, for example.

In yet another embodiment of the individual activity monitoring system and method 10, the mobile device application computer program continually monitors the operation of the mobile device 32 on which it is running. When the screen of the mobile device 32 is switched on by the user, then the mobile device application computer program sends a reset notification to the remote monitoring system 14.

Another embodiment of the individual activity monitoring system and method 10 provides a means for a recipient of an alert notification message to acknowledge that the recipient has received the alert notification. If the remote monitoring system 14 has sent an alert notification message to all the telephone numbers in the preconfigured list of telephone numbers, then the remote monitoring system 14 proceeds to send a second alert notification message to the first telephone number in the preconfigured list of telephone numbers associated with the specific local monitor device 12. The content of the second alert notification message instructs the recipient of the message to acknowledge that they have received the message either by responding with an SMS message or by pressing a dial pad key on the telephone. If the elapsed time since sending the alert notification message to the first telephone number exceeds a preconfigured time limit value, and no reset event has occurred, and no acknowledgement has been received from the alert notification message recipient, then the remote monitoring system 14 sends a second alert notification message to the next telephone number in the list of telephone numbers. The recipient of the alert notification message is provided with an opportunity to acknowledge receipt of the message in the same fashion as the first recipient. This process is repeated for each telephone number in the list of telephone numbers. If a reset event occurs at any time, or if an acknowledgement is received from any alert notification message recipient at any time, the event is recorded corresponding to the local monitor device 12 along with the time of the event, and no further alert notification messages are sent.

It should be noted that the individual activity monitoring system and method 10 may be implemented in alternative arrangements than what is described in detail herein. For example, the local monitoring device 12 may be a stand-alone device that is operable to perform all of the aforementioned functions without having to contact a remote monitoring system 14. In other words, the functions of the local monitoring device 12 and the remote monitoring system 14 may be merged and performed by one locally-positioned monitor device. For example, the local monitoring device 12 may monitor for and record water flow events, identify a period lacking a water flow event exceeding a predetermined time period, and make a determination that the situation warrants alert notification. The local monitoring device 12 may include the list of preconfigured telephone numbers and perform the alert notification transmissions without cooperation with the remote monitoring system.

The features of the present invention which are believed to be novel are set forth below with particularity in the appended claims. However, modifications, variations, and changes to the exemplary embodiments described above will be apparent to those skilled in the art, and the individual activity monitoring system and method described herein thus encompasses such modifications, variations, and changes and are not limited to the specific embodiments described herein.

What is claimed is:

1. An individual activity monitoring system, comprising:

a microphone configured to receive sounds and convert them to audio signals;

a memory configured to store recorded audio signal patterns of monitored water flow events selected from the group consisting of water flowing from a faucet into a kitchen sink, water flowing from a faucet bathroom sink, water flowing from a shower head, water filling a bathtub, and toilet flushing; and a microprocessor coupled to the microphone and configured to receive the audio signals, compare the audio signals to the recorded audio signal patterns, and recognize whether the audio signals represent the monitored water flow event, the microprocessor being configured to reset a reset clock in response to a recognized monitored water flow event, and being further configured to issue an alert notification in response to an absence of a subsequent monitored water flow event after the reset clock exceeds a preprogrammed time period since a last recognized monitored water flow event.

2. The individual activity monitoring system of claim 1, wherein the microprocessor is further configured to store a timestamp associated with each recognized monitored water flow event.

3. The individual activity monitoring system of claim 1, further comprising a user interface comprising a reset button configured to receive input from a user indicative of a desire to reset the reset clock.

4. The individual activity monitoring system of claim 1, further comprising a user interface comprising an alert button configured to receive input from a user indicative of a desire to issue an alert notification.

5. The individual activity monitoring system of claim 1, further comprising a network interface coupled to the microprocessor and configured to transmit an alert notification to at least one preprogrammed recipient.

6. The individual activity monitoring system of claim 1, further comprising a network interface coupled to the microprocessor and configured to transmit an alert notification to at least one preprogrammed recipient specified by at least one telephone number stored in the memory.

7. The individual activity monitoring system of claim 1, further comprising:

a local monitor device situated in a user's monitored facility, the local monitor device including the microphone, the memory, and the microprocessor configured to recognize a monitored water flow event and further transmitting a reset notification; and a remote monitor system in communication with the local monitor device and configured to receive the reset notification, and reset the reset clock in response to the received reset notification, and to transmit an alert notification to at least one preprogrammed recipient specified by at least one telephone number in response to the reset clock exceeding the preprogrammed time period since a last received reset notification.

8. The individual activity monitoring system of claim 1, wherein the microprocessor is further configured to recognize a prolonged monitored water flow event having a duration exceeding a predetermined time period, and issue an alert notification in response to the recognized prolonged monitored water flow event.

9. The individual activity monitoring system of claim 1, wherein the microprocessor is further configured to calibrate the preprogrammed time period to adapt to a particular individual user.

10. The individual activity monitoring system of claim 1, further comprising program logic executing on a mobile device configured to receive user input and communicating the user input to the microprocessor.

11. An individual activity monitoring method, comprising:

storing recorded audio signal patterns of monitored water flow events selected from the group consisting of water flowing from a faucet into a kitchen sink, water flowing from a faucet bathroom sink, water flowing from a shower head, water filling a bathtub, and toilet flushing;

receiving sounds and converting them to audio signals; and comparing the audio signals to the recorded audio signal patterns, and recognizing whether the audio signals represent the monitored water flow event, further resetting a reset clock in response to a recognized monitored water flow event, and issuing an alert notification in response to an absence of a subsequent water flow event after the reset clock exceeds a preprogrammed time period since a last recognized monitored water flow event.

12. The individual activity monitoring method of claim 11, further comprising storing a timestamp associated with each recognized water flow event.

13. The individual activity monitoring method of claim 11, further comprising receiving a reset input from a user indicative of a desire to reset the reset clock.

14. The individual activity monitoring method of claim 11, further comprising receiving an alert input from a user indicative of a desire to issue an alert notification.

15. The individual activity monitoring method of claim 11, further comprising transmitting an alert notification to at least one preprogrammed recipient.

16. The individual activity monitoring method of claim 11, further comprising a transmitting an alert notification to at least one preprogrammed recipient specified by at least one telephone number stored in the memory.

17. The individual activity monitoring method of claim 11, further comprising:

recognizing a water flow event, at a local monitor device situated in a user's monitored facility, and further transmitting a reset notification; and receiving the reset notification, at a remote monitor system, and resetting the reset clock in response to the received reset notification, and transmitting an alert notification to the at least one preprogrammed recipient specified by at least one telephone number in response to the reset clock exceeding the preprogrammed time period since a last received reset notification.

18. The individual activity monitoring method of claim 11, further comprising recognizing a prolonged water flow event having a duration exceeding a predetermined time period, and issuing an alert notification in response to the recognized prolonged water flow event.

19. The individual activity monitoring method of claim 11, further comprising calibrating the preprogrammed time period to adapt to a particular individual user.

20. The individual activity monitoring method of claim 11, further comprising receiving user input via a mobile application configured to execute on a mobile device, and communicating the user input to the microprocessor.

21. The individual activity monitoring method of claim 20, wherein receiving user input via a mobile application comprises receiving at least one telephone number representing at least one recipient for the alert notification.

22. The individual activity monitoring method of claim 20, wherein receiving user input via a mobile application comprises receiving a numeral input from a user indicative of a desire to temporarily disable the monitoring for a time period representative of the numeral input.

23. The individual activity monitoring method of claim 20, wherein receiving user input via a mobile application comprises receiving a reset input from a user indicative of a desire to reset the reset clock.

24. The individual activity monitoring method of claim 20, wherein receiving user input via a mobile application comprises receiving an alert input from a user indicative of a desire to issue an alert notification.

* * * * *